(12) United States Patent
Tang et al.

(10) Patent No.: US 10,591,577 B2
(45) Date of Patent: Mar. 17, 2020

(54) POSITIONING METHOD AND DEVICE

(71) Applicant: GUANGDONG OPPO MOBILE TELECOMMUNICATIONS CORP., LTD., Dongguan, Guangdong (CN)

(72) Inventors: Hai Tang, Dongguan (CN); Yuanqing Zeng, Dongguan (CN)

(73) Assignee: GUANGDONG OPPO MOBILE TELECOMMUNICATION CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/572,998

(22) PCT Filed: Apr. 27, 2016

(86) PCT No.: PCT/CN2016/080339
§ 371 (c)(1),
(2) Date: Nov. 9, 2017

(87) PCT Pub. No.: WO2017/000646
PCT Pub. Date: Jan. 5, 2017

(65) Prior Publication Data
US 2018/0128893 A1    May 10, 2018

(30) Foreign Application Priority Data
Jul. 1, 2015   (CN) .......................... 2015 1 0382738

(51) Int. Cl.
*G01S 5/02*   (2010.01)
*H04B 7/0413*   (2017.01)
(Continued)

(52) U.S. Cl.
CPC .............. *G01S 5/02* (2013.01); *G01S 5/0263* (2013.01); *H04B 7/0413* (2013.01);
(Continued)

(58) Field of Classification Search
CPC ....... H04W 64/00; H04W 88/06; H04W 4/02; H04W 48/18; H04W 4/021; H04W 36/32;
(Continued)

(56) References Cited

U.S. PATENT DOCUMENTS

2007/0018811 A1 *   1/2007   Gollu ................... G01C 21/005
                                                    340/539.13
2009/0310585 A1   12/2009   Alizadeh-Shabdiz
(Continued)

FOREIGN PATENT DOCUMENTS

CN   102854490 A   1/2003
CN   1849525 A   10/2006
(Continued)

OTHER PUBLICATIONS

Supplementary European Search Report in European application No. 16817010.8, dated Mar. 19, 2018.
(Continued)

*Primary Examiner* — Fred A Casca

(57) ABSTRACT

Disclosed is a positioning method. The positioning method includes operations as follows. Multiple pieces of positioning information of various RATs are acquired, each pieces of positioning information among the multiple pieces of positioning information is determined by means of a corresponding RAT, and is representative of a position area of a terminal. Position information of the terminal is determined according to the multiple pieces of positioning information.

12 Claims, 3 Drawing Sheets

Acquire multiple pieces of positioning information of various RATs, each piece of positioning information among the multiple pieces of positioning information is determined by means of a corresponding RAT, and is representative of a position area of a terminal — S101

Determine position information of the terminal according to the multiple pieces of positioning information — S102

(51) Int. Cl.

| | |
|---|---|
| *H04B 7/06* | (2006.01) |
| *H04L 1/06* | (2006.01) |
| *H04W 16/28* | (2009.01) |
| *H04W 16/24* | (2009.01) |
| *H04W 64/00* | (2009.01) |
| *H04W 4/029* | (2018.01) |
| *H04W 16/18* | (2009.01) |
| *H04L 5/00* | (2006.01) |
| *G01S 5/00* | (2006.01) |
| *H04W 88/02* | (2009.01) |

(52) U.S. Cl.
CPC ............ *H04B 7/0617* (2013.01); *H04L 1/06* (2013.01); *H04L 1/0612* (2013.01); *H04W 4/029* (2018.02); *H04W 16/24* (2013.01); *H04W 16/28* (2013.01); *H04W 64/00* (2013.01); *G01S 5/0027* (2013.01); *G01S 5/0236* (2013.01); *H04L 5/0007* (2013.01); *H04W 16/18* (2013.01); *H04W 88/02* (2013.01)

(58) Field of Classification Search
CPC ...... H04W 4/029; H04W 4/027; H04L 67/16; H04L 67/18; H04L 12/145; H04M 2207/20; H04M 2242/30; H04M 2203/1091; H04M 15/8033; H04M 2215/22
USPC ... 455/456.1, 436, 456.2, 435.1, 440, 452.1, 455/456.6, 404.2, 426.1, 450, 456.3, 509, 455/422.1
See application file for complete search history.

(56) References Cited

U.S. PATENT DOCUMENTS

| | | |
|---|---|---|
| 2009/0312035 A1 | 12/2009 | Alizadeh-Shabdiz |
| 2009/0312036 A1 | 12/2009 | Alizadeh-Shabdiz |
| 2012/0177025 A1 | 7/2012 | Huang et al. |
| 2012/0220335 A1* | 8/2012 | Mori ..................... H04W 76/16 455/552.1 |
| 2013/0288708 A1 | 10/2013 | Alizadeh-Shabdiz |
| 2013/0324107 A1* | 12/2013 | Lindoff ................. H04W 24/10 455/422.1 |
| 2014/0135033 A1 | 5/2014 | Alizadeh-Shabdiz |
| 2014/0213277 A1* | 7/2014 | Jang ..................... H04W 28/08 455/453 |
| 2014/0235266 A1 | 8/2014 | Edge et al. |
| 2015/0117411 A1* | 4/2015 | Jeong ................ H04W 36/0061 370/331 |
| 2015/0237504 A1* | 8/2015 | Xie ....................... H04W 16/10 455/454 |

FOREIGN PATENT DOCUMENTS

| | | |
|---|---|---|
| CN | 101378360 A | 3/2009 |
| CN | 101387699 A | 3/2009 |
| CN | 101545966 A | 9/2009 |
| CN | 101594389 A | 12/2009 |
| CN | 102186143 A | 9/2011 |
| CN | 102378358 A | 3/2012 |
| CN | 102833724 A | 12/2012 |
| CN | 103206952 A | 7/2013 |
| CN | 103257355 A | 8/2013 |
| CN | 104581854 A | 4/2015 |
| WO | 2006086398 A2 | 8/2006 |

OTHER PUBLICATIONS

Second Office Action of the Chinese application No. 201510382738.3, dated Aug. 8, 2019.
Espacenet English abstract of CN 102854490 A.
Espacenet English abstract of CN 1849525 A.

* cited by examiner

POSITIONING METHOD AND DEVICE

RELATED APPLICATION

This application is an application under 35 U.S.C. 371 of International Application No. PCT/CN2016/080339 filed on Apr. 27, 2016, the entire contents of which are incorporated herein by reference.

This application claims priority to Patent Application No. 201510382738.3, entitled "Positioning Method and Device", filed on Jul. 1, 2015, the contents of which are incorporated herein by reference.

TECHNICAL FIELD

Embodiments of the disclosure relate to communications, and in particular to a positioning method and device.

BACKGROUND

Radio Access Technology (RAT) can be used to position a terminal. Moreover, different RATs may be different in coverage area and positioning performance due to technology features, bands, base station distribution, transmitting power, antenna configurations (quantity, azimuth and the like), receiving sensitivity and the like.

However, each RAT has a certain error in positioning, and positioning of the terminal through a traditional RAT can only be applied to an outdoor wide space. This results in that requirements for accuracy and extent of positioning cannot be met.

SUMMARY

The embodiments of the disclosure provide a positioning method using various RATs, which can improve the positioning accuracy.

According to a first aspect, a positioning method is provided. The positioning method includes operations as follows. Multiple pieces of positioning information of various RATs are acquired, each pieces of positioning information among the multiple pieces of positioning information is determined by means of a corresponding RAT, and is representative of a position area of a terminal. Position information of the terminal is determined according to the multiple pieces of positioning information.

According to a second aspect, a positioning device is provided. The positioning device includes: an acquisition unit, configured to acquire multiple pieces of positioning information of various RATs, each of the multiple pieces of positioning information being determined by means of the corresponding RAT, and each piece of positioning information being representative of a position area of a terminal; and a determination unit, configured to determine position information of the terminal according to the multiple pieces of positioning information.

In the embodiments of the disclosure, joint positioning of a terminal is implemented by using various RATs, which can improve the positioning accuracy, and the various-RAT-based joint positioning method can be applied to indoor scenarios and the like.

BRIEF DESCRIPTION OF DRAWINGS

In order to more clearly illustrate the technical solutions in the embodiments of the disclosure, drawings to be used in the description for the embodiments or the related art will be simply introduced. Obviously, the drawings described below are merely some of the embodiments of the disclosure. On the premise of no creative work, a person of ordinary skill in the art may also obtain other drawings according to these drawings.

DETAILED DESCRIPTION

The technical solutions in the embodiments of the disclosure will be clearly and completely described below in conjunction with the drawings in the embodiments of the disclosure. Obviously, the described embodiments are merely some of the embodiments of the disclosure, not all of the embodiments. Based on the embodiments of the disclosure, all other embodiments obtained on the premise of no creative work of a person of ordinary skill in the art should fall within the scope of protection of the disclosure.

It is to be noted that in the embodiments of the disclosure, an RAT may also be referred to as a radio technology, including, but not limited to, Long Term Evolution (LTE) commonly known as Fourth Generation (4G), a Wireless Local Area Network (WLAN), future Fifth Generation (5G) and the like.

It is to be noted that in the embodiments of the disclosure, a terminal may be a mobile terminal, including, but not limited to, a cell phone, a Personal Digital Assistant (PDA), a terminal device in a future 5G network and the like.

It is to be noted that in the embodiments of the disclosure, a network device may be a base station controller or base station server for centralized management and control of multiple base stations of various RATs, or may be a Mobility Management Entity (MME) capable of communicating with the base stations. The disclosure does not make limitations to this.

It is to be noted that in the embodiments of the disclosure, both the terminal and the network device support various RATs. Moreover, the various RATs may independently use their respective software and hardware resources or share same software and hardware resources. Here, the software and hardware resources may include an antenna, a radio frequency module, a baseband module, a processor, a storage system, a user interface and the like. When the same software and hardware resources are shared, the various RATs may use the same software and hardware resources separately or simultaneously.

Figure 1:
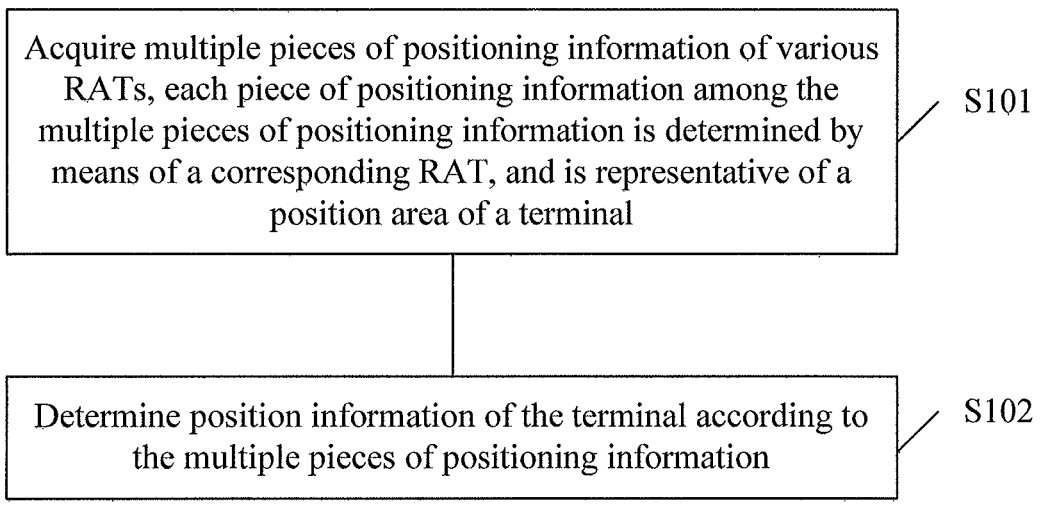
FIG. 1 illustrates a flowchart of a positioning method according to an embodiment of the disclosure.

FIG. 1 illustrates a flowchart of a positioning method according to an embodiment of the disclosure. The positioning method as shown in FIG. 1 may be executed by a terminal, or may be executed by a network device, or may be executed by another device (such as a positioning server). The method as shown in FIG. 1 includes operations as follows.

In S101, multiple pieces of positioning information according to various RATs are acquired. Each piece of positioning information among the multiple pieces of positioning information is determined by means of a corresponding RAT, and is representative of a position area of the terminal.

In S102, position information of the terminal is determined according to the multiple pieces of positioning information.

In some embodiments of the disclosure, joint positioning of a terminal is implemented by using various RATs, which can improve the positioning accuracy. Moreover, the various-RAT-based joint positioning method can be applied to indoor scenarios and the like.

It can be understood that in the embodiments of the disclosure, each RAT can determine positioning information.

Herein, positioning information of the terminal may be determined by using an RAT through a method known in the art. An RAT A1 is taken as an example. If a base station B1 of the RAT A1 can receive signals from the terminal, the base station B1 of the RAT A1 can determine positioning information of the terminal, that is, the terminal is located within a serving range (cell) of the base station B1 of the RAT A1, and thus a range where the terminal is located can be determined. If both the base station B1 and a base station B2 of the RAT A1 can receive signals of the terminal, it can be determined that the terminal is located in an overlapping area of cells of the base station B1 and the base station B2, and thus a small range where the terminal is located can be determined.

It is to be noted that positioning information of the terminal determined by each RAT is also associated with an inherent error of the RAT. For example, if the inherent error of the RAT A1 is 50 m, a minimal range of the terminal which can be determined by the RAT A1 depends on the inherent error of the RAT A1, that is, a circular error of 50 m.

It can be understood that before S101, the method includes: the terminal sends uplink data to base stations of the various RATs, so that the base stations of the various RATs determine the positioning information of the terminal according to the uplink data. Alternatively, the uplink data may carry information of time at which the terminal sends the uplink data.

For example, if the inherent error of the RAT A1 is e1, and the terminal sends a data packet to the base station B1 of the RAT A1 at time t1, the data packet carrying information of sending time (t1), the base station B1 can determine a distance L1 between the terminal and the base station B1 according to a difference between time t2 at which the data packet is received and the time t1. Thus, the positioning information determined by using the RAT A1 is: the distance between the terminal and the base station B1 is L1±e1.

Moreover, it can be understood that the positioning information of the terminal determined by using an RAT is also associated with a transmission condition for a radio signal.

In S101, multiple pieces of positioning information may be directly acquired from the base stations of the various RATs. Or, the multiple pieces of positioning information may be gathered in a base station (such as base station B3), and then are acquired from the base station (such as base station B3). In this case, communication interfaces are provided between all base stations of different RATs. Interaction of positioning information of different RATs may be performed in a unified information format. For example, position information within a digital map in the present area may be contained, positioning accuracy information of the present RAT may be contained, and etc.

Or, if the method in FIG. 1 is executed by a network device, in S101, the network device may acquire multiple pieces of positioning information from the terminal. That is, the terminal assists the network device in executing the method in FIG. 1. Or, if the method in FIG. 1 is executed by another device such as a positioning server, in S101, the positioning server may acquire multiple pieces of positioning information from the terminal. That is, the terminal assists the positioning server in executing the method in FIG. 1.

Herein, the multiple pieces of positioning information are received by the terminal from one or more base stations of the various RATs. For example, the terminal may forward the multiple pieces of positioning information to the network device after directly or indirectly acquiring the multiple pieces of positioning information from the base stations of the various RATs. For example, after multiple pieces of positioning information of various RATs are gathered to one or more base stations of at least one RAT, the terminal may acquire the multiple pieces of positioning information from the one or more base stations of at least one RAT.

In some embodiments of the disclosure, before S102, the method may include: registration information sent by the base stations of the various RATs is received. In this case, S102 may include: position information of the terminal is determined according to the registration information and the multiple pieces of positioning information.

Herein, the registration information may include: position information of a base station, band information of the base station, transmitting power of the base station, and antenna configuration information of the base station.

For example, the antenna configuration information may include quantity of antennae and azimuth angles of the antennae. Here, the azimuth angles may include an azimuth (horizontal azimuth) and an elevation.

For example, the position information of the base station may include longitude information of the base station, latitude information of the base station and height information of the base station.

As an example, the network device may acquire registration information of various non-satellite radio technologies within coverage areas thereof. The various non-satellite radio technologies may include, but not limited to, an RAT (e.g., a cellular radio technology such as Global System for Mobile Communications (GSM)/Wideband Code Division Multiple Access (WCDMA)/LTE and Worldwide Interoperability for Microwave Access (WiMAX), and WLAN, Bluetooth, Near Field Communication (NFC), Zigbee and the like) and a positioning specific radio technology (e.g., a system in which multiple base stations transmit broadcast information for positioning).

The network device may record the registration information. For example, a used band, position information of a base station (three-dimensional position containing horizontal and vertical positions), transmitting power, antenna configuration information (quantity, azimuth angles containing an azimuth and an elevation, and the like) and the like are registered, and a rough coverage map is formed in conjunction with a digital map of the locating area. When a new station is added, registered information can be updated.

As another example, the registration information is sent by the base station by broadcast, wherein a broadcast message may be sent by the base station over dedicated signaling.

The terminal in an area may acquire the registration information through the broadcast message. For example, a band used by one or more non-satellite radio technologies in the present area, position information of a base station, transmitting power, antenna configuration information and the like are acquired.

Alternatively, in some embodiments of the disclosure, various RATs may include at least one primary RAT and at least one secondary RAT. In this case, in S102, position information of the terminal may be determined according to positioning information of the at least one primary RAT.

That is, at least one primary RAT may be taken as a main positioning technology, and at least one secondary RAT may be taken as an auxiliary positioning technology. In addition, it can be understood that primary-secondary switching may be performed according to the positioning performance.

Alternatively, in S102, at least one piece of positioning information may be selected from the multiple pieces of positioning information according to a demand for positioning accuracy; and then, position information of the terminal is determined according to the at least one piece of positioning information.

For example, the type(s) and number of appropriate RAT(s) may be selected from the various RATs according to a demand for positioning accuracy (e.g., whether a map or navigation software is opened; whether the terminal is in a stationary state for a long time period), the position of the terminal, and other information.

Thus, the position of the terminal can be determined according to merely one or more pieces of positioning information in the various RATs, so that the calculation time can be shortened, and the positioning efficiency can be improved.

Alternatively, in an embodiment, in S102, the position information of the terminal may be determined according to an overlapping area of the multiple pieces of positioning information. It can also be understood that an intersection determined by the multiple pieces of positioning information is determined as the position of the terminal.

In the embodiments of the disclosure, the positioning accuracies of the various RATs are different from each other. The various RATs may be classified into two types, i.e., a first type of RATs and a second type of RATs. The positioning accuracy of the first type of RATs is lower than that of the second type of RATs. In this case, in S102, a rough range of the terminal is determined according to multiple pieces of positioning information of the second type of RATs; and position information of the terminal is determined based on the rough range according to multiple pieces of positioning information of the second type of RATs.

For example, the first type of RATs may be RATs supporting continuous coverage, and the second type of RATs may be RATs deployed in a hotspot manner.

Specifically, the positioning accuracies of the RATs (such as GSM/WCDMA/LTE and positioning specific radio technology) supporting continuous coverage and the RATs (e.g., WLAN, Bluetooth, NFC and Zigbee) deployed in a hotspot manner. The positioning accuracy of the RATs deployed in the hotspot manner is high due to a high band, a low transmitting power and a small coverage area. In this case, in S102, a rough position range of the terminal may be obtained by using a continuous-coverage RAT; when the terminal becomes close to a base station of an RAT with a small coverage area and a high positioning accuracy, position information of the terminal is modified by using high-accuracy positioning information, so as to determine refined position information of the terminal.

Thus, in the embodiment, high-accuracy position information of the terminal can be obtained in conjunction with the positioning information of the terminal obtained by the various RATs.

It can be understood that by positioning the terminal at different periods of time in S102, information such as a movement trail and a movement speed of the terminal may be determined according to time related position information. Further, a possible position of the terminal at a next time may be predicted. In addition, the terminal may be navigated by means of a digital map and the like.

Specifically, the terminal may insert a time stamp into uplink data or signaling of one or more RATs according to a demand (e.g., opening of a map or navigation software), and after base stations of one or more RATs receive the uplink data or signaling including the time stamp, positioning information including time information may be obtained. That is, the positioning information may include a position area, and time information corresponding to the position area.

For example, at time 1 (marked as t1), the terminal sends a data packet into which a time stamp is inserted to a base station of an RAT A; at time 2 (marked as t2), the terminal moves out of a coverage area of the RAT A, and sends a data packet into which a time stamp is inserted to a base station of an RAT B; at time 3 (marked as t3), the terminal moves out of a coverage area of the RAT B, and sends a data packet into which a time stamp is inserted to a base station of an RAT C; and at time 4 (marked as t4), the terminal returns to the coverage area of the RAT A, and sends a data packet into which a time stamp is inserted to the base station of the RAT A. The sequence of the above times is t1→t2→t3→t4. Accordingly, after the base stations of the RATs A, B and C receive the data packets respectively, the position and movement sequence of the terminal may be determined as: the coverage area of the base station of the RAT A at time t1→the coverage area of the base station of the RAT B at time t2→the coverage area of the base station of the RAT C at time t3→the coverage area of the base station of the RAT A at time t4.

Thus, in S102, the position information of the terminal may be determined. Meanwhile, the movement trail of the terminal may also be determined in conjunction with the time information. Moreover, gathering of the positioning information of the various RATs may obtain more accurate and comprehensive position information and movement trail of the terminal.

Alternatively, in another embodiment, in S102, if it is determined that first positioning information of a first RAT in the various RATs has a possibility of being inaccurate, position information of the terminal is determined according to other pieces of positioning information, which are those among the multiple pieces of positioning information other than the first positioning information.

Specifically, due to some factor such as an obstacle in a radio signal transmission path (e.g., a corner), it is difficult to ensure the same or similar positioning accuracy within the whole coverage area by using a same radio technology. In this case, positioning information of other radio technologies may be used for modification.

For example, if the first positioning information of the first RAT is not intersected with any one of other pieces of positioning information in terms of a position area, it may be determined that the first positioning information is inaccurate. In this case, the first RAT may not be used for positioning.

For example, when it is determined that positioning information of a certain radio technology may be inaccurate (e.g., the position is suddenly changed during low-speed movement of the terminal), positioning information of another or more radio technologies may be used for correcting an error.

Specifically, position information of the terminal may be determined according to multiple pieces of positioning information of other RATs than the first RAT in the multiple RATs. For example, position information of the terminal may be determined by using a weighted average of other pieces of positioning information, which are those among the multiple pieces of positioning information other than the first positioning information. Here, the other pieces of positioning information mean positioning information of other RATs.

Alternatively, in an embodiment, the method in FIG. 1 is executed by the terminal. In this case, in S102, position information of the terminal may be determined according to the multiple pieces of positioning information in conjunction with positioning information acquired by a built-in sensor of the terminal. The built-in sensor of the terminal may include one or more of the following: a magnetometer, a pedometer, a barometer, an acceleration detector and the like.

Thus, the multiple pieces of positioning information of the various RATs and the positioning information of the built-in sensor are used jointly, and mutual error correction may be performed, so that the positioning accuracy can be improved.

Further, the terminal may track the state (such as signal quality, transmission rate and cell load) of the various RATs in real time, and predict future possible handover or technology failure. The terminal may inform the network device of this information. Thus, the network device may adjust a positioning policy according to prediction information, for example, disconnect an RAT which may be failed.

In the embodiments of the disclosure, by jointly using various RATs or jointly using various RATs and a built-in sensor technology of a terminal, the positioning and navigation capabilities of a radio system can be effectively improved. Moreover, the embodiments of the disclosure may be applied to scenarios in which the Global Navigation Satellite System (GNSS) cannot be used or the performance cannot be met, such as an indoor scenario.

Figure 2:
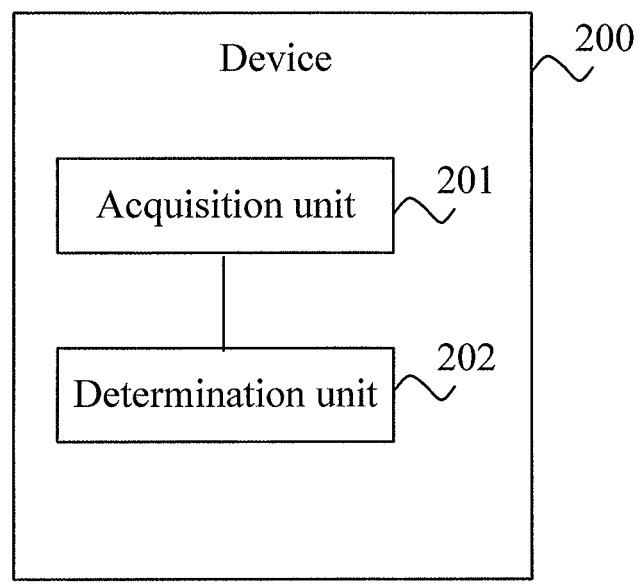
FIG. 2 illustrates a structure block diagram of a device according to an embodiment of the disclosure.

FIG. 2 is a structure block diagram of a positioning device according to an embodiment of the disclosure. The device 200 as shown in FIG. 2 includes an acquisition unit 201 and a determination unit 202.

The acquisition unit 201 is configured to acquire multiple pieces of positioning information of various RATs. Each piece of positioning information among the multiple pieces of positioning information is determined by means of a corresponding RAT, and is representative of a position area of a terminal.

The determination unit 202 is configured to determine position information of the terminal according to the multiple pieces of positioning information acquired by the acquisition unit 201.

In the embodiments of the disclosure, joint positioning for a terminal is implemented by using various RATs, which can improve the positioning accuracy. The various-RAT-based joint positioning method can be applied to indoor scenarios and the like.

Alternatively, in an embodiment, the acquisition unit 201 may further be configured to receive registration information sent by base stations of the various RATs. Correspondingly, the determination unit 202 may be specifically configured to determine position information of the terminal according to the registration information and the multiple pieces of positioning information.

Herein, the registration information may include: position information of the base station, band information of the base station, transmitting power of the base station, and antenna configuration information of the base station. The position information of the base station may include: longitude information of the base station, latitude information of the base station and height information of the base station. The antenna configuration information of the base station may include: quantity of antennae and azimuth angles of the antennae.

In the embodiments of the disclosure, the device 200 in FIG. 2 may be a network device. Or, the device 200 may be a positioning server. Or, the device 200 may be a terminal.

Alternatively, if the device 200 is a terminal, the registration information may be sent by the base station by broadcast, wherein a broadcast message may be sent by the base station over dedicated signaling.

It can be understood that if the device 200 is a terminal, the device 200 may further include a transmission unit, configured to send uplink data to the base stations of the various RATs, so that the base stations of the various RATs determine the positioning information of the terminal according to the uplink data. The uplink data carries information of time at which the terminal sends the uplink data.

Thus, the base stations of the RATs may determine positioning information of the terminal, and the positioning information may include a correspondence between a position range of the terminal and time information.

Alternatively, the determination unit 202 may be specifically configured to: determine position information of the terminal according to the multiple pieces of positioning information in conjunction with positioning information acquired by a built-in sensor of the terminal. The built-in sensor of the terminal may include one or more of the following: a magnetometer, a pedometer, a barometer, an acceleration detector and the like.

Alternatively, in an embodiment, the determination unit 202 may be specifically configured to determine position information of the terminal according to an overlapping area of the multiple pieces of positioning information.

Alternatively, in another embodiment, the determination unit 202 may be specifically configured to select at least one piece of positioning information from the multiple pieces of positioning information according to a demand for positioning accuracy and determine position information of the terminal according to the at least one piece of positioning information.

Alternatively, in another embodiment, the various RATs include at least one primary RAT and at least one secondary RAT. The determination unit 202 may be specifically configured to: determine position information of the terminal according to positioning information of the at least one primary RAT. The determination unit 202 may be further configured to: switch one or more primary RATs of the at least one primary RAT into secondary RATs; and/or, switch one or more secondary RATs of the at least one secondary RAT into primary RATs. That is, primary-secondary switching may be performed on the primary RATs and the secondary RATs. Specifically, primary-secondary switching may be performed according to a network state, an RAT state and the like.

Alternatively, in another embodiment, the positioning information further includes time information corresponding to the position area. in this case, the determination unit 202 may be specifically configured to determine position information of the terminal and a movement trail of the terminal according to the multiple pieces of positioning information.

Alternatively, as another embodiment, the various RATs include a first type of RATs and a second type of RATs. The positioning accuracy of the first type of RATs is lower than that of the second type of RATs. The determination unit 202 may be specifically configured to: determine a rough range of the terminal according to multiple pieces of positioning information of the first type of RATs; and determine position information of the terminal based on the rough range according to multiple pieces of positioning information of the second type of RATs. The first type of RATs may be RATs supporting continuous coverage, and the second type of RATs may be RATs deployed in a hotspot manner.

Alternatively, in another embodiment, the determination unit 202 may be specifically configured to: when first positioning information of a first RAT in the various RATs has a possibility of being inaccurate, determine position information of the terminal according to other pieces of positioning information, which are those among the multiple pieces of positioning information other than the first positioning information. The position information of the terminal may be determined by using a weighted average of the other pieces of positioning information.

In the embodiments of the disclosure, by jointly using various RATs or jointly using various RATs and a built-in sensor technology of a terminal, the positioning and navigation capabilities of a radio system can be effectively improved. Moreover, the embodiments of the disclosure may be applied to scenarios in which a GNSS cannot be used or the performance cannot be met, such as an indoor scenario.

Figure 3:
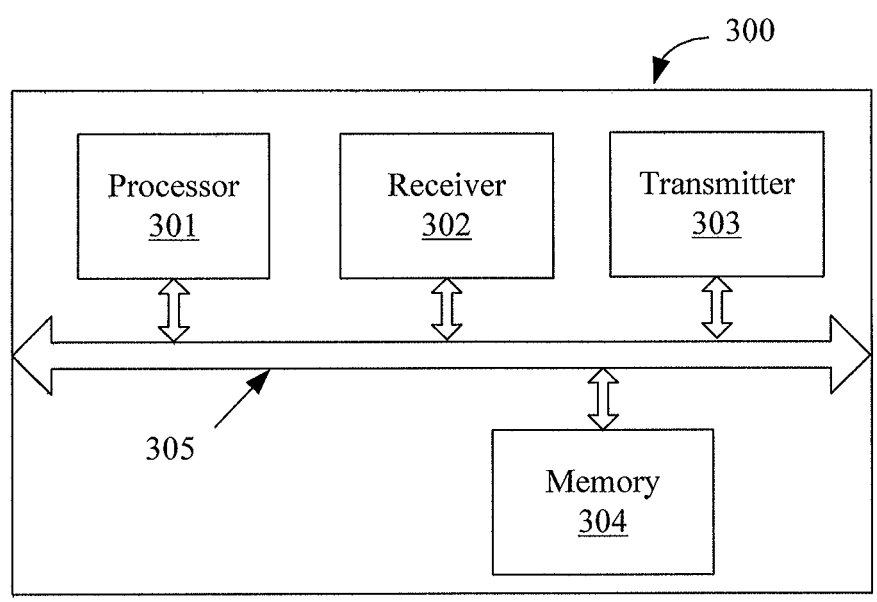
FIG. 3 illustrates a structure block diagram of a device according to another embodiment of the disclosure.

It is to be noted that in the embodiments of the disclosure, the acquisition unit 201 may be implemented by a receiver, the transmission unit may be implemented by a transmitter, and the determination unit 202 may be implemented by a processor. As shown in FIG. 3, a device 300 may include a processor 301, a receiver 302, a transmitter 303 and a memory 304. The memory 304 may be used to store codes to be executed by the memory 301 and the like.

All components in the device 300 are coupled together through a bus system 305, wherein the bus system 305 includes a data bus, and further includes a power bus, a control bus and a state signal bus.

The device 200 as shown in FIG. 2 and the device 300 as shown in FIG. 3 can implement each process implemented in the abovementioned method embodiment in FIG. 1. No elaboration will be performed for avoiding repetition.

A person of ordinary skill in the art may realize that units and algorithm operations of each example described in the embodiments of the disclosure can be implemented by electronic hardware, or combination of computer software and electronic hardware. Whether these functions are executed in a manner of hardware or software depends on specific applications and design restraint conditions of the technical solution. Professionals may implement the described functions by using different methods for each specific application. However, this implementation shall not be regarded to be beyond the scope of the disclosure.

Those skilled in the art may clearly know that for convenience and conciseness of description, the specific operation process of the system, apparatus and unit described above may be seen from the corresponding process in the abovementioned method embodiment, and will not be elaborated herein.

In some embodiments provided by the disclosure, it is to be understood that the disclosed system, apparatus and method may be implemented in another manner. The apparatus embodiment described above is merely schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between the displayed or discussed components may be indirect coupling or communication connection, implemented through some interfaces, the apparatuses or the units, and may be electrical or mechanical or adopt other forms.

The abovementioned units described as separate parts may or may not be physically separated, and parts displayed as units may or may not be physical units, and namely may be located in the same place, or may be distributed among multiple network units. Part or all of the units may be selected to achieve the purpose of the solutions of the embodiment according to a practical requirement.

In addition, each function unit in each embodiment of the disclosure may be integrated into a processing unit, each unit may also exist independently, or two or more units may also be integrated into a unit.

When being implemented in a form of software function unit and sold or used as an independent product, the function may also be stored in a computer-readable storage medium. Based on such an understanding, the technical solution of the disclosure substantially or parts making contributions to the conventional art may be embodied in a form of software product, and the computer software product is stored in a storage medium, including multiple instructions configured to enable a computer device (which may be a personal computer, a server, a network device or the like) to execute all or part of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disc.

The above is only the specific implementation manner of the disclosure and not intended to limit the scope of protection of the disclosure, and any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A positioning method, executed by a terminal, the method comprising:
   acquiring multiple pieces of positioning information of various Radio Access Technologies (RATs) which are non-satellite radio technologies, each piece of positioning information among the multiple pieces of positioning information being determined by means of a corresponding RAT, and being representative of a position area of a terminal; and
   determining position information of the terminal according to the multiple pieces of positioning information,
   wherein the various RATs comprise at least one primary RAT and at least one secondary RAT; and
   wherein the determining the position information of the terminal according to the multiple pieces of positioning information comprises:
   determining the position information of the terminal according to positioning information of the at least one primary RAT, and
   wherein the method further comprises at least one of the following:
   switching one or more primary RATs of the at least one primary RAT into secondary RATs;
   or, switching one or more secondary RATs of the at least one secondary RAT into primary RATs, wherein the method further comprises: before acquiring the multiple pieces of positioning information of various RATs,
sending, by the terminal, uplink data to base stations of the various RATs, so that the base stations of the various RATs determine the positioning information of the terminal according to the uplink data, wherein the uplink data carries information of time at which the terminal sends the uplink data,
wherein before determining position information of the terminal according to the multiple pieces of positioning information, the method further comprises:
receiving registration information sent by the base stations of the various RATs; and
determining the position information of the terminal according to the multiple pieces of positioning information comprises:
determining the position information of the terminal according to the registration information and the multiple pieces of positioning information,
wherein the registration information comprises:
position information of the base station, band information of the base station, transmitting power of the base station, and antenna configuration information of the base station;
wherein the determining the position information of the terminal according to the multiple pieces of positioning information comprises:
determining that first positioning information of a first RAT in the various RATs has a possibility of being inaccurate, determining the position information of the terminal according to other pieces of positioning information, which are those among the multiple pieces of positioning information other than the first positioning information.

2. The method according to claim 1, wherein the registration information is sent by the base station in a broadcast message form, and the broadcast message is sent by the base station over dedicated signaling.

3. The method according to claim 2, wherein the determining the position information of the terminal according to the multiple pieces of positioning information comprises:
determining the position information of the terminal according to the multiple pieces of positioning information in conjunction with positioning information acquired by a built-in sensor of the terminal.

4. The method according to claim 1, wherein the positioning information further comprises time information corresponding to the position area; and
wherein the determining the position information of the terminal according to the multiple pieces of positioning information comprises:
determining the position information of the terminal and a movement trail of the terminal according to the multiple pieces of positioning information.

5. The method according to claim 1, wherein the various RATs comprise a first type of RATs and a second type of RATs, wherein a positioning accuracy of the first type of RATs is lower than that of the second type of RATs; and
wherein the determining the position information of the terminal according to the multiple pieces of positioning information comprises:
determining a rough range of the terminal according to multiple pieces of positioning information of the first type of RATs; and
determining the position information of the terminal based on the rough range according to multiple pieces of positioning information of the second type of RATs,
wherein the first type of RATs are RATs supporting continuous coverage, and the second type of RATs are RATs deployed in a hotspot manner.

6. The method according to claim 1, wherein the determining the position information of the terminal according to the other pieces of positioning information, which are those among the multiple pieces of positioning information other than the first positioning information comprises:
determining the position information of the terminal by using a weighted average of the other pieces of positioning information.

7. A positioning device, comprising:
a processor; and
a memory storing computer readable instructions executable by the processor,
wherein the processor is configured to:
acquire multiple pieces of positioning information of various Radio Access Technologies (RATs) which are non-satellite radio technologies, wherein each piece of positioning information among the multiple pieces of positioning information is determined by means of the corresponding RAT, and is representative of a position area of a terminal; and
determine position information of the terminal according to the multiple pieces of positioning information,
wherein the various RATs comprise at least one primary RAT and at least one secondary RAT; and
wherein the processor is specifically configured to determine the position information of the terminal according to positioning information of the at least one primary RAT,
wherein the processor is further configured to perform at least one of the following:
switch one or more primary RATs of the at least one primary RAT into secondary RATs;
or, switch one or more secondary RATs of the at least one secondary RAT into primary RATs,
wherein before acquiring the multiple pieces of positioning information of the various RATs, the processor is further configured to send uplink data to base stations of the various RATs, so that the base stations of the various RATs determine the positioning information of the terminal according to the uplink data, wherein the uplink data carries information of time at which the terminal sends the uplink data,
wherein the processor is configured to:
receive registration information sent by the base stations of the various RATs; and
determine the position information of the terminal according to the registration information and the multiple pieces of positioning information,
wherein the registration information comprises:
position information of the base station, band information of the base station, transmitting power of the base station, and antenna configuration information of the base station;
wherein the processor is configured to:
determine that first positioning information of a first RAT in the various RATs has a possibility of being inaccurate, determine the position information of the terminal according to a weighted average of other pieces of positioning information, which are those among the multiple pieces of positioning information other than the first positioning information.

8. The device according to claim 7, wherein the device is the terminal, and the registration information is sent by the base station in a broadcast message form, and the broadcast message is sent by the base station over dedicated signaling.

9. The device according to claim 8, wherein the processor is configured to:
   determine position information of the terminal according to the multiple pieces of positioning information in conjunction with positioning information acquired by a built-in sensor of the terminal.

10. The device according to claim 7, wherein the positioning information further comprises time information corresponding to the position area; and
   wherein the processor is configured to determine the position information of the terminal and a movement trail of the terminal according to the multiple pieces of positioning information.

11. The device according to claim 7, wherein the various RATs comprise a first type of RATs and a second type of RATs, wherein positioning accuracy of the first type of RATs is lower than that of the second type of RATs; and
   wherein the processor is configured to:
   determine a rough range of the terminal according to multiple pieces of positioning information of the first type of RATs; and
   determine the position information of the terminal based on the rough range according to multiple pieces of positioning information of the second type of RATs,
   wherein the first type of RATs are RATs supporting continuous coverage, and the second type of RATs are RATs deployed in a hotspot manner.

12. A non-transitory computer readable storage medium, storing computer readable instructions, which when executed by a processor, cause the processor to perform a positioning method, the method comprising:
   acquiring multiple pieces of positioning information of various Radio Access Technologies (RATs) which are non-satellite radio technologies, each piece of positioning information among the multiple pieces of positioning information being determined by means of a corresponding RAT, and being representative of a position area of a terminal; and
   determining position information of the terminal according to the multiple pieces of positioning information,
   wherein the various RATs comprise at least one primary RAT and at least one secondary RAT; and
   wherein the determining the position information of the terminal according to the multiple pieces of positioning information comprises:
   determining the position information of the terminal according to positioning information of the at least one primary RAT, and
   wherein the method further comprises at least one of the following:
   switching one or more primary RATs of the at least one primary RAT into secondary RATs;
   or, switching one or more secondary RATs of the at least one secondary RAT into primary RATs,
   wherein the method further comprises: before acquiring the multiple pieces of positioning information of various RATs,
   sending, by the terminal, uplink data to base stations of the various RATs, so that the base stations of the various RATs determine the positioning information of the terminal according to the uplink data, wherein the uplink data carries information of time at which the terminal sends the uplink data,
   wherein before determining position information of the terminal according to the multiple pieces of positioning information, the method further comprises:
   receiving registration information sent by the base stations of the various RATs; and
   determining the position information of the terminal according to the multiple pieces of positioning information comprises:
   determining the position information of the terminal according to the registration information and the multiple pieces of positioning information,
   wherein the registration information comprises:
   position information of the base station, band information of the base station, transmitting power of the base station, and antenna configuration information of the base station;
   wherein the determining the position information of the terminal according to the multiple pieces of positioning information comprises:
   determining that first positioning information of a first RAT in the various RATs has a possibility of being inaccurate, determining the position information of the terminal according to other pieces of positioning information, which are those among the multiple pieces of positioning information other than the first positioning information.

* * * * *